United States Patent
Hoshino

(10) Patent No.: US 11,112,688 B2
(45) Date of Patent: Sep. 7, 2021

(54) LIGHT SOURCE APPARATUS, IMAGE PROJECTION APPARATUS, AND CONTROL APPARATUS THAT CONTROL MULTIPLE LIGHT SOURCES AT DIFFERENT LIGHTING TIMINGS

(71) Applicant: CANON KABUSHIKI KAISHA, Tokyo (JP)

(72) Inventor: Kimiya Hoshino, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/549,352

(22) Filed: Aug. 23, 2019

(65) Prior Publication Data

US 2020/0073220 A1 Mar. 5, 2020

(30) Foreign Application Priority Data

Aug. 31, 2018 (JP) .............................. JP2018-162674

(51) Int. Cl.
*G03B 21/20* (2006.01)
*G03B 21/16* (2006.01)
*H04N 9/31* (2006.01)
*G03B 21/00* (2006.01)

(52) U.S. Cl.
CPC ......... *G03B 21/2053* (2013.01); *G03B 21/16* (2013.01); *G03B 21/204* (2013.01); *G03B 21/006* (2013.01)

(58) Field of Classification Search
CPC ................ G03B 21/16; G03B 21/2013; G03B 21/2033; G03B 21/204; H04N 9/3144; H04N 9/3155; H04N 9/3161; H04N 9/3164
See application file for complete search history.

(56) References Cited

U.S. PATENT DOCUMENTS

| | | | |
|---|---|---|---|
| 7,012,384 B2 | 3/2006 | Tatewaki et al. | |
| 9,304,382 B2* | 4/2016 | Toyooka | G03B 21/2053 |
| 9,459,452 B2* | 10/2016 | Hada | G03B 21/2033 |
| 9,888,220 B2 | 2/2018 | Chikahisa | |
| 9,897,907 B2* | 2/2018 | Hsieh | G03B 33/08 |
| 9,933,694 B2* | 4/2018 | Toyooka | G03B 21/2053 |
| 10,165,240 B2* | 12/2018 | Li | H04N 9/3194 |
| 10,656,512 B2* | 5/2020 | Ashizawa | G03B 21/2066 |
| 2011/0075103 A1* | 3/2011 | Ogawa | G03B 33/08 353/31 |

(Continued)

FOREIGN PATENT DOCUMENTS

| | | |
|---|---|---|
| JP | 2003021875 A | 1/2003 |
| JP | 2003212037 A | 7/2003 |

(Continued)

*Primary Examiner* — Bao-Luan Q Le
(74) *Attorney, Agent, or Firm* — Rossi, Kimms & McDowell LLP

(57) ABSTRACT

A light source apparatus includes a first light source, a second light source configured to emit light with a different wavelength than that of the first light source; and a controller for controlling each of the first and second light sources. The controller provides a control such that the second light source takes a longer time from a lighting start to a lighting completion than the first light source, and the second light source starts lighting earlier than the first light source.

8 Claims, 9 Drawing Sheets

(56) References Cited

U.S. PATENT DOCUMENTS

| | | | |
|---|---|---|---|
| 2013/0107221 A1* | 5/2013 | Hsu | G03B 21/204 353/31 |
| 2013/0107223 A1* | 5/2013 | Toyooka | G03B 21/2033 353/31 |
| 2015/0092118 A1* | 4/2015 | Hada | G02B 27/01 349/11 |
| 2015/0316775 A1* | 11/2015 | Hsieh | G03B 21/204 353/31 |
| 2016/0170293 A1* | 6/2016 | Toyooka | G03B 21/006 353/84 |
| 2016/0211648 A1 | 7/2016 | Shimizu | |
| 2017/0099469 A1* | 4/2017 | Matsumoto | G02B 27/0101 |
| 2017/0104970 A1* | 4/2017 | Li | G03B 21/16 |
| 2018/0217483 A1* | 8/2018 | Ashizawa | G03B 21/204 |

FOREIGN PATENT DOCUMENTS

| | | |
|---|---|---|
| JP | 2013097229 A | 5/2013 |
| JP | 2016131219 A | 7/2016 |
| JP | 2016224304 A | 12/2016 |

* cited by examiner

LIGHT SOURCE APPARATUS, IMAGE PROJECTION APPARATUS, AND CONTROL APPARATUS THAT CONTROL MULTIPLE LIGHT SOURCES AT DIFFERENT LIGHTING TIMINGS

BACKGROUND OF THE INVENTION

Field of the Invention

The present invention relates to a light source apparatus suitable for an image projection apparatus, such as a liquid crystal projector.

Description of the Related Art

Some of image projection apparatuses (referred to as projectors hereinafter) that modulate light emitted from a light source with a light modulation element, such as a liquid crystal panel, and project the light onto a projection surface use a laser diode (LD) as a light source. As disclosed in Japanese Patent Laid-Open No. ("JP") 2016-224304, some of these projectors uses a plurality of LDs (blue LD and red LD) that emit light fluxes with different wavelengths.

The red LD characteristically it is more likely to cause an optical damage (COD: Catastrophic Optical Damage) particularly when the temperature is low than the blue LD. JP 2016-131219 discloses a method for suppressing the COD. Nevertheless, the method disclosed in JP 2016-131219 takes a time to complete turning on the LD in order to control the drive current supplied to the LD, and consequently makes longer the startup time of the projector.

SUMMARY OF THE INVENTION

The present invention provides a light source apparatus and an image projection apparatus, each of which can shorten a startup time while suppressing the COD in a light source, such as a red LD.

A light source apparatus according to one aspect of the present invention includes a first light source, a second light source configured to emit light with a different wavelength than that of the first light source; and a controller for controlling each of the first and second light sources. The controller provides a control such that the second light source takes a longer time from a lighting start to a lighting completion than the first light source, and the second light source starts lighting earlier than the first light source. An image projection apparatus according to another aspect of the present invention includes the above light source apparatus, and a light modulator configured to modulate light from the light source apparatus, and projects an image formed by light from the light modulator onto a projection surface.

A control method according to another aspect of the present invention of a light source apparatus having a first light source and a second light source configured to emit light with a wavelength different from that of the first light source includes the steps of starting lighting the second light source prior to starting lighting the first light source, and controlling the second light source over a longer time than the first light source from a lighting start to a lighting completion. A non-transitory computer-readable storage medium according to another aspect of the present invention stores a computer program configured to causing a computer in a light source apparatus including a first light source and a second light source configured to emit light with a wavelength different from the first light source, to execute the above control method.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
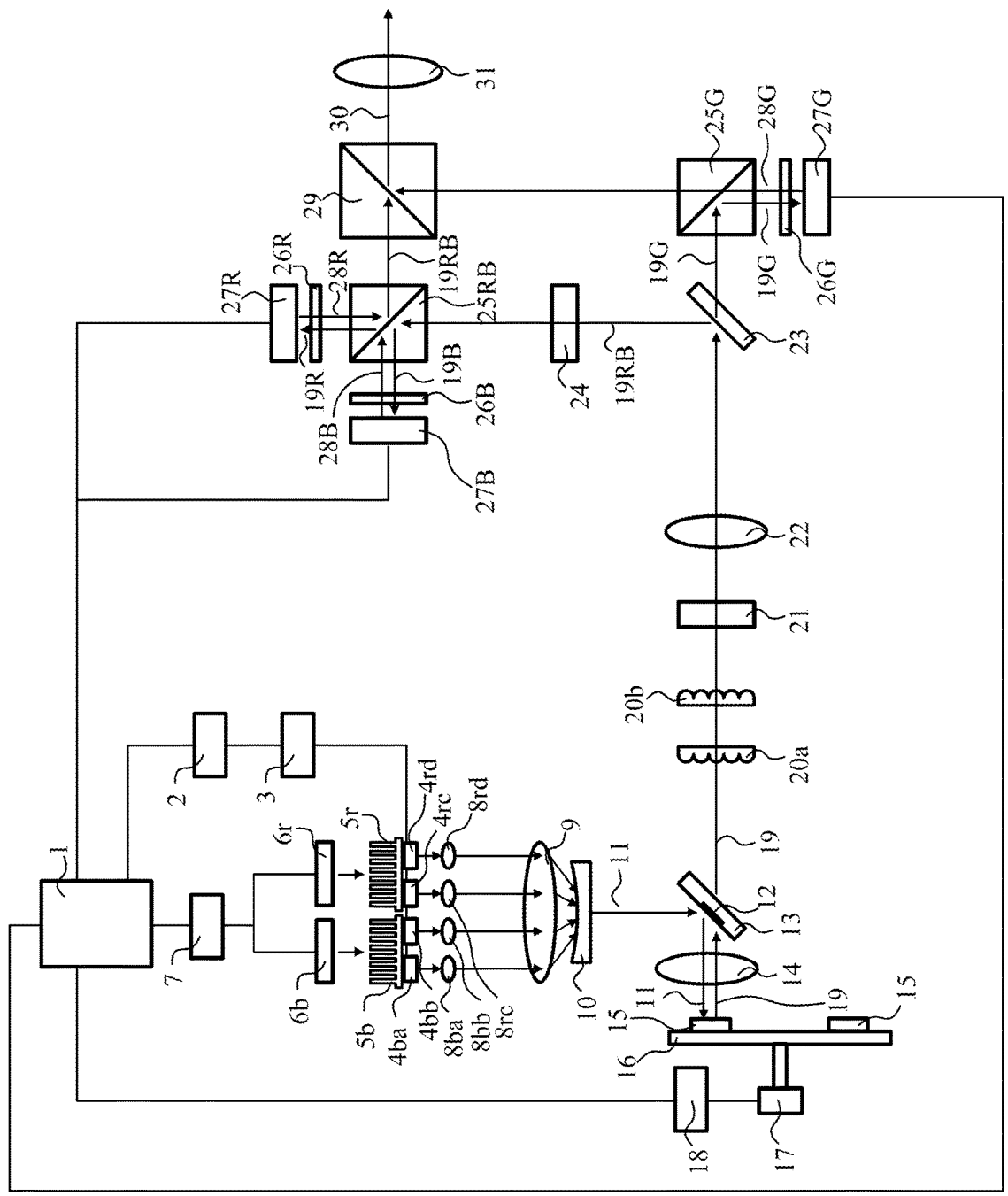
FIG. 1 is a block diagram showing the configuration of a projector according to a first embodiment of the present invention.

FIG. 1 illustrates a configuration of a projector as an image projection apparatus according to a first embodiment of the present invention. In the following description, R, G, and B respectively mean red, green, and blue. Reference numeral 1 denotes a system controller, reference numeral 2 denotes a drive current calculator, and reference numeral 3 denotes a light source driver. Reference numerals 4ba and 4bb denote B light sources, and reference numerals 4rc and 4rd denote R light sources. Reference numeral 5b denotes a B light source heat sink (heat sink for the B light source), reference numeral 5r denotes an R light source heat sink (heat sink for the R light source), reference numeral 6b denotes a B light source cooler (cooler for the B light source), reference numeral 6r denotes an R light source cooler (cooler for the R light source), and reference numeral 7 denotes a cooling controller.

Reference numerals 8ba and 8bb denote B collimator lenses, and reference numerals 8rc and 8rd denote R collimator lenses. Reference numeral 9 denotes a first lens, reference numeral 10 denotes a second lens, reference numeral 12 denotes a light reflecting member, reference numeral 13 denotes a glass plate, and reference numeral 14 denotes a third lens. Reference numeral 15 denotes a phosphor (fluorescent body), reference numeral 16 denotes a phosphor (fluorescent body) support member, reference numeral 17 denotes a motor, and reference numeral 18 denotes a motor controller. Reference numeral 20a denotes a first fly eye lens, reference numeral 20b denotes a second fly eye lens, reference numeral 21 denotes a polarization conversion element, and reference numeral 22 denotes a fourth lens.

Reference numeral 23 denotes a dichroic mirror, reference numeral 24 denotes a wavelength selective phase plate, reference numeral 25RB denotes an RB polarization beam splitter, reference numeral 25G denotes a G polarization beam splitter, reference numeral 26R denotes an R quarter waveplate, reference numeral 26G denotes a G quarter waveplate, and reference numeral 26B denotes a B quarter waveplate. Reference numeral 27R denotes an R light modulator, reference numeral 27G denotes a G light modulator, and reference numeral 27B denotes a B light modulator. Reference numeral 29 denotes a color combining prism, and reference numeral 31 denotes a projection lens.

The drive current calculator 2 calculates the drive currents for the B light sources 4ba and 4bb and the R light sources 4rc and 4rd in accordance with an instruction from the system controller 1. The light source driver 3 supplies each drive current calculated by the drive current calculator 2 to each light source to drive it.

The B light sources (first light sources) 4ba and 4bb use the same semiconductor laser diodes that emit B light (blue light). The peak wavelength of each of the B light sources 4ba and 4bb is 455 nm. The R light sources (second light sources) 4rc and 4rd use the same semiconductor laser diodes that emit R light (red light) with a wavelength different from that of the B light. The peak wavelength of each of the R light source 4rc and 4rd is 635 nm. The B light sources 4ba and 4bb are attached to the B light source heat sink 5b. The R light sources 4rc and 4rd are attached to the R light source heat sink 5r. A copper plate or the like provided with a radiation fin is used as each heat sink. Each light source and each heat sink may be in close contact with a thermal conduction member such as a thermal conduction sheet. The number of B light sources and the number of R light sources may not be two.

Arranged on the back of the B light source heat sink 5b and the R light source heat sink 5r are the B light source cooler (referred to as a B light source cooling fan hereinafter) 6b and the R light source cooler (referred to as an R light source cooling fan 6r hereinafter).

The B light source heat sink 5b and the R light source heat sink 5r are cooled by the cooling air from the B light source cooling fan 6b and the R light source cooling fan 6r. The number of rotations (fan rotation number) of each of the B light source cooling fan 6b and the R light source cooling fan 6r is controlled by the cooling controller 7 based on an instruction of the system controller 1. When the drive voltage of each cooling fan is increased, the fan rotation number is increased, and when the drive voltage is decreased, the fan rotation number is decreased. In FIG. 1, arrow directions extending from the B light source cooling fan 6b and the R light source cooling fan 6r indicate the cooling air directions.

The B light source heat sink 5b and the R light source heat sink 5r respectively average the heats generated by the B light sources 4ba and 4bb and the heats generated by the R light sources 4rc and 4rd. By cooling the B light source heat sink 5b and the R light source heat sink 5r with the B light source cooling fan 6b and the R light source cooling fan 6r, respectively, the B light sources 4ba and 4bb and the R light sources 4rc and 4rd can be simultaneously cooled.

The B light fluxes emitted from the B light sources 4ba and 4bb enter the B collimate lenses 8ba and 8bb, respectively. The R light fluxes emitted from the R light sources 4rc and 4rd enter R collimator lenses 8rc and 8rd, respectively. Each collimator lens converts the light from each corresponding light source into substantially parallel light. The arrow direction from each light source in FIG. 1 represents an optical path and a light traveling direction. The same applies to the subsequent optical paths.

The light emitted from each collimator lens enters the first lens 9 and the second lens 10 and is emitted as the excitation light 11. The first lens 9 and the second lens 10 serve to adjust the beam diameter of the light emitted from each of the collimator lenses.

The excitation light 11 is reflected by the light reflecting member 12 provided on the surface of the glass plate 13, and irradiated onto the phosphor (wavelength conversion element) 15 through the third lens 14. The light reflecting member 12 is provided only on a portion of the surface of the glass plate 13 onto which the excitation light 11 is irradiated. The third lens 14 condenses the excitation light 11 and forms a light irradiation area of a predetermined size on the phosphor 15.

The phosphor 15 is made, for example, of YAG:Ce. The phosphor 15 is provided circumferentially around the rotation axis of the motor 17 and supported by the phosphor support member 16. The phosphor support member 16 is typically made of a metal plate such as aluminum. However, the material is not limited to the metal plate as long as it similarly serves as the metal plate. The motor 17 rotates the phosphor 15 and the phosphor support member 16 in order to efficiently radiate the heat from the phosphor 15. The number of rotations of the motor 17 is controlled by the motor controller 18 in accordance with an instruction of the system controller 1.

The phosphor 15 converts part of the B light in the excitation light 11 to generate yellow fluorescent light. The fluorescence light and the excitation light (unconverted light) of B not wavelength-converted by the fluorescent substance 15 and the R light are combined to generate illumination light 19 as white (W) light.

The illumination light 19 enters the third lens 14 and is converted into substantially parallel light. The illumination light 19 having transmitted through the third lens 14 further transmits through a portion of the glass plate 13 other than the light reflecting member 12, transmits through the first fly eye lens 20a and the second fly eye lens 20b, is split into a plurality of light fluxes, and enters the polarization conversion element 21. The polarization conversion element 21 converts the illumination light 19 as nonpolarized light into linearly polarized light having one specific polarization direction. In general, the light flux from the LD is linearly polarized light, but the illumination light 19 from the phosphor 15 is nonpolarized light. Hence, in order to efficiently perform a polarization separation in a polarization beam splitter to be described later, the polarization conversion element 21 is provided to convert it into linearly polarized light (S-polarized light having a polarization direction perpendicular to the paper plane of FIG. 1).

The plurality of light fluxes as the illumination light 19 emitted from the polarization conversion element 21 are collected by the fourth lens 22 and superimposed on the three light modulators 27R, 27G, and 27B. Thereby, each light modulation part is uniformly illuminated.

The illumination light 19 that has transmitted through the fourth lens 22 is guided to the dichroic mirror 23. The dichroic mirror 23 reflects the RB light 19RB in the illumination light 19 and transmits the G light 19G. The S-polarized G light 19G that has transmitted through the dichroic mirror 23 enters the G polarization beam splitter 25G, is reflected by the polarization splitting surface, and reaches the G light modulator 27G. Here, the G light modulator 27G is a digitally driven reflection type liquid crystal display element, and forms an original image for modulating the G light 19G. The system controller 1 drives the G light modulator 27G to form the original image according to an input image signal from the outside. At this time, the system controller 1 turns on and off each pixel of the G light modulator 27G within each frame period, and controls the duty ratio of the ON/OFF driving to instruct the G light modulator 27G to express the plurality of gradations. The same applies to the R light modulator 27R and the B light modulator 27B.

The G light modulator 27G modulates and reflects the G light 19G according to the original image. Thereby, the modulated light 28G is emitted from the G light modulator 27G. The S-polarized light component of the modulated light 28G is reflected on the polarization splitting surface of the G polarization beam splitter 25G, returned to the light source side, and removed from the projection light. On the other hand, the P-polarized light component of the modulated light 28G passes through the polarization splitting surface of the G polarization beam splitter 25G. At this time, where all polarized light components are converted into the S-polarized light (referred to as an all-black display state hereinafter), the slow axis or the fast axis of the quarter waveplate 26G is the incident light axis to the G polarization beam splitter 25G, and adjust in the direction perpendicular to the plane including the reflected light axis. Thereby, the influence of the disturbance of the polarization state generated by the G polarization beam splitter 25G and the G light modulator 27G can be suppressed to a small level. The modulated light 28G emitted from the G polarization beam splitter 25G enters the color combining prism 29.

The RB light 19RB reflected on the dichroic mirror 23 enters the wavelength selective phase plate 24. The wavelength selective phase plate 24 converts the R light into the P-polarized light by rotating its polarization direction by 90°, and transmits the B light as the S-polarized light without rotating its polarization direction. The RB light 19RB that has transmitted through the wavelength selective phase plate 24 enters the RB polarization beam splitter 25RB.

The RB polarization beam splitter 25RB transmits the R light 19R as the P-polarized light and reflects the B light 19B as the S-polarized light. The R light 19R that has transmitted through the polarization splitting surface of the RB polarization beam splitter 25RB is modulated and reflected by the R light modulator 27R, and is emitted as the modulated light 28R. The P-polarized light component of the modulated light 28R transmits through the polarization splitting surface of the RB polarization beam splitter 25RB, is returned to the light source side, and is removed from the projection light. On the other hand, the S-polarized light component of the modulated light 28R is reflected by the polarization splitting surface of the RB polarization beam splitter 25RB and enters the color combining prism 29.

The B light 19B reflected on the polarization splitting surface of the RB polarization beam splitter 25RB is modulated and reflected by the B light modulator 27B and becomes modulated light 28B. The S-polarized light component of the modulated light 28B is reflected by the polarization splitting surface of the RB polarization beam splitter 25RB, returned to the light source side, and removed from the projection light. On the other hand, the P-polarized light component of the modulated light 28B transmits through the polarization splitting surface in the RB polarization beam splitter 25RB and enters the color combining prism 29. At this time, the all-black display state of each of R and B can be adjusted by adjusting the slow axis of the quarter waveplates 26R and 26B in the same manner as the G quarter waveplate 26G. The RB light 19RB thus combined into a single light flux and emitted from the RB polarization beam splitter 25RB enters the color combining prism 29.

The color combining prism 29 transmits the RB light 19RB and reflects the G light 19G to combine them and to generate projection light 30. The projection light 30 is enlarged and projected onto an unillustrated projection surface, such as a screen, via a projection lens 31. Thereby, a colored image as a projection image is displayed. The optical path illustrated in FIG. 1 is the one when the projector is displaying an all-white image. The following embodiments assume that the projector displays an all-white image, unless otherwise specified.

Figure 2:
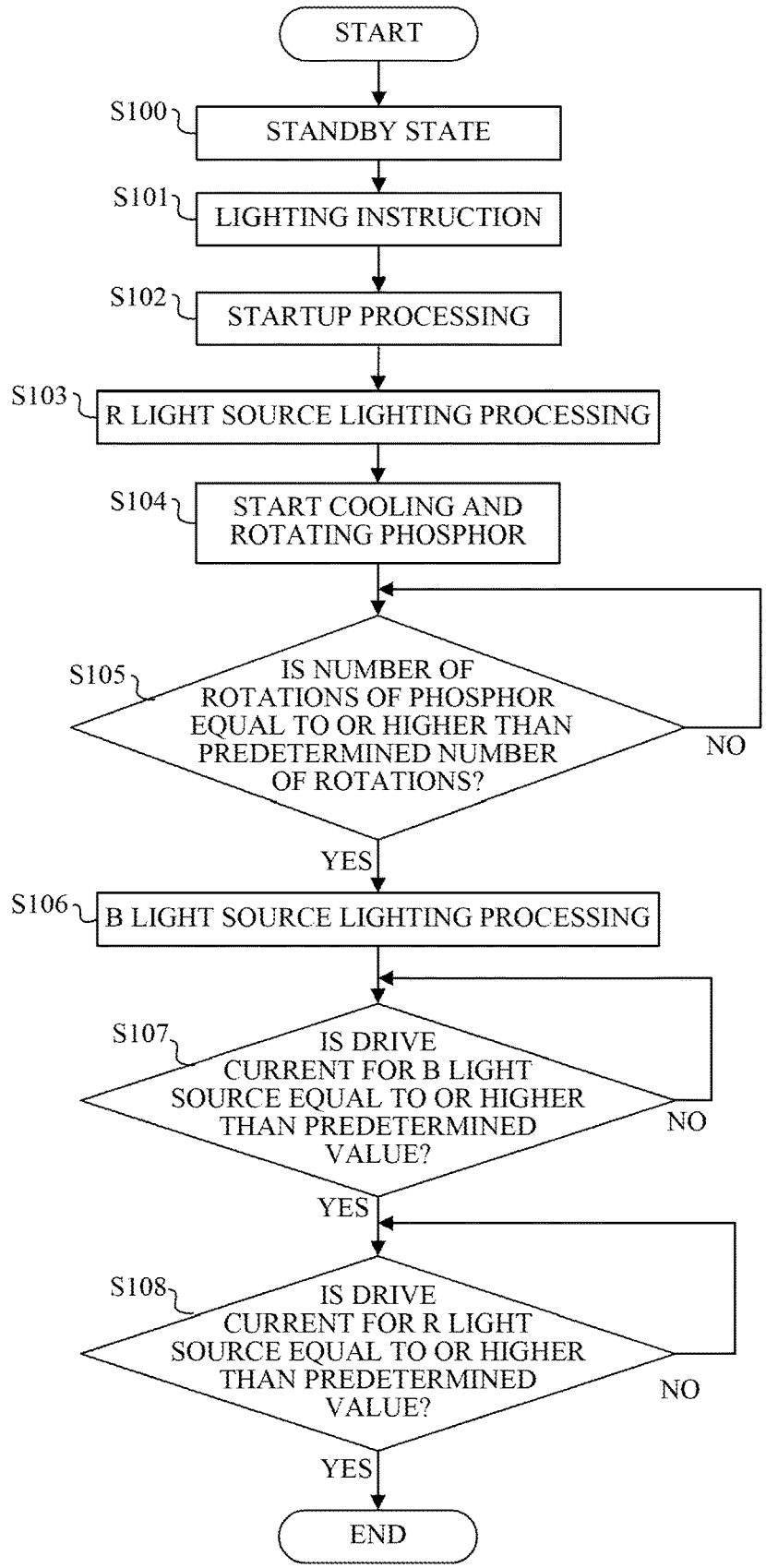
FIG. 2 is a flowchart showing processing according to the first embodiment.
Figure 3:
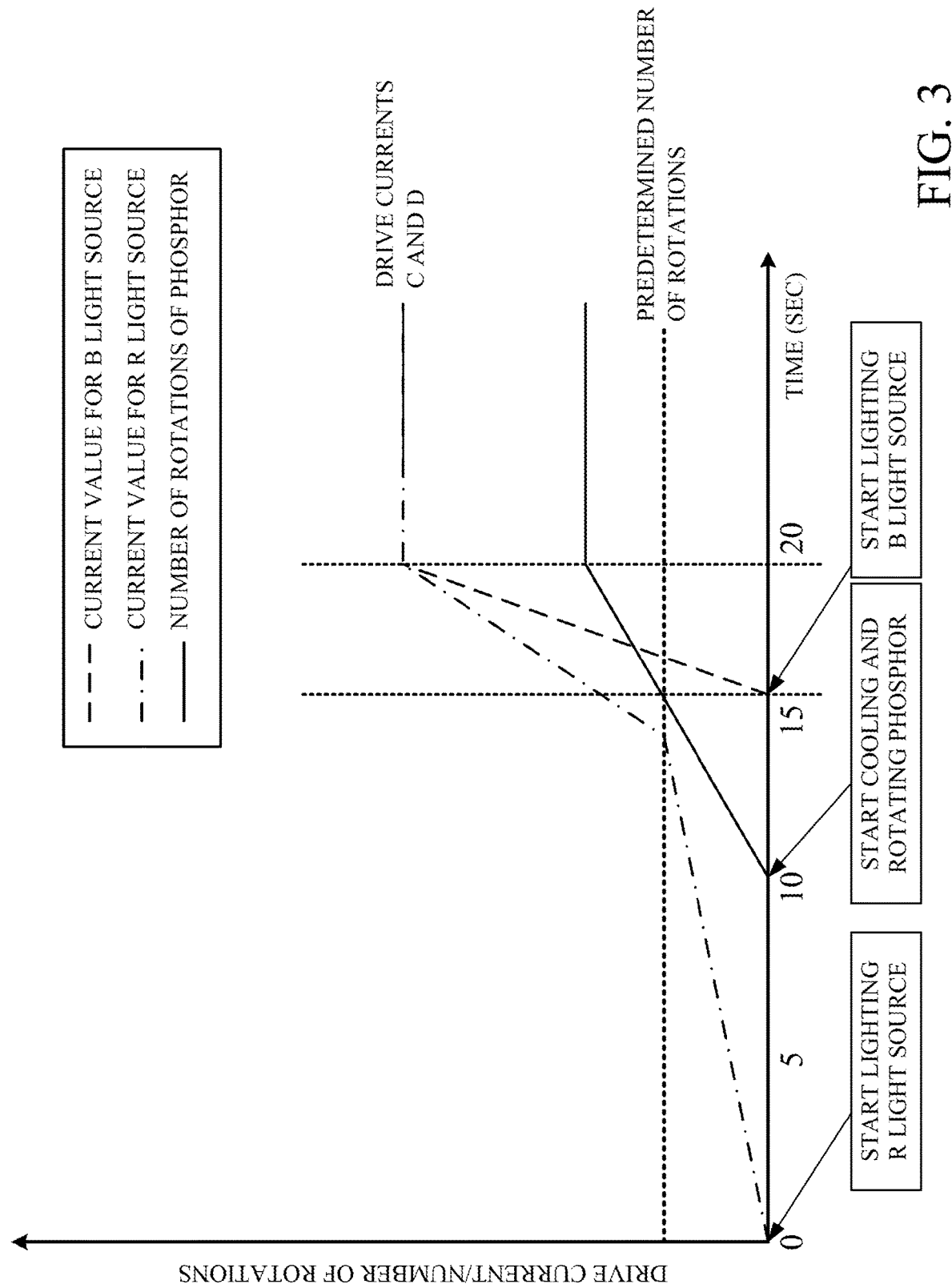
FIG. 3 is a time chart showing processing according to the first embodiment.

Referring now to FIGS. 2 and 3, a description will be given of a lighting order of the B light sources 4ba and 4bb and the R light sources 4rc and 4rd in the projector 100. A flowchart of FIG. 2 illustrates processing of starting up the B light sources 4ba and 4bb and the R light sources 4rc and 4rd or processing from a turning-off state to a lighting completion of a predetermined lighting state. FIG. 3 illustrates temporal changes in the driving currents of the B light sources 4ba and 4bb and the R light sources 4rc and 4rd and the number of rotations of the phosphor 15. The system controller 1, the drive current calculator 2, and the cooling controller 7 constitute a controller. The system controller 1 executes this processing in accordance with a computer program.

Initially, in the step S100, the projector 100 is in a standby state. In the standby state, the B light sources 4ba and 4bb and the R light sources 4rc and 4rd are turned off, and the power is supplied only to the system controller 1.

In the step S101, the system controller 1 having received a lighting instruction by the user's operation performs startup processing of the entire projector 100 in the step S102.

Next, in the step S103, the system controller 1 causes the drive current calculator 2 to calculate a drive current for turning on the R light sources 4rc and 4rd, and causes the light source driver 3 to supply the drive current to the R light sources 4rc and 4rd. As illustrated in FIG. 3, the drive current calculator 2 continuously increases the drive currents supplied to the R light sources 4rc and 4rd from the lighting start current from 0 to a predetermined current C corresponding to a predetermined lighting state (lighting completion state). More specifically, for example, the drive currents of the R light sources 4rc and 4rd are increased from 0 to a predetermined current C by taking a predetermined time of about 15 seconds. The predetermined lighting (turning-on) state (lighting completion state) is, for example, a lighting state which becomes a preset brightness of the light source (predetermined brightness of the light source), such as "setting the brightness of the projection light," and "setting the brightness of the light source" settable by a user's menu operation or the like.

Next, in the step S104, the system controller 1 instructs the cooling controller 7 to rotate the R and B light source cooling fans 6r and 6b. The system controller 1 rotates the motor 17 through the motor controller 18 and rotates the phosphor 15. More specifically, as illustrated in FIG. 3, about 10 seconds as the predetermined time after supplying the drive current to each of the R light sources 4rc and 4rd is started, the R and B light sources cooling fans 6r and 6b and the phosphor 15 start rotating.

Next, in the step S105, the system controller 1 determines whether or not the number of rotations of the phosphor 15 (motor 17) has reached the predetermined number of rotations or higher. When the number of rotations of the phosphor 15 is equal to or higher than the predetermined number of rotations, the system controller 1 proceeds to the step S106. On the other hand, if the number of rotations of the phosphor 15 is not equal to or higher than the predetermined number of rotations, the system controller 1 makes the determination in the step S105 again after the predetermined standby time has elapsed. In this embodiment, in order to prevent the phosphor 15 from being damaged by the irradiation of the excitation light 11, the B light sources 4ba and 4bb are turned on only when the number of rotations of the phosphor 15 reaches the predetermined rotation number or higher. In FIG. 3, the number of rotations of the phosphor 15 reaches the predetermined rotation number about 5 seconds after the phosphor 15 starts rotating.

In the step S106 after the number of rotations of the phosphor 15 reaches the predetermined number of rotations, the system controller 1 instructs the drive current calculator 2 to calculate the drive currents for lighting the B light sources 4ba and 4bb, and instructs the light source driver 3 to supply the drive currents to the B light sources 4ba and 4bb. As illustrated in FIG. 3, the drive current calculator 2 sharply increases the drive currents supplied to the B light sources 4ba and 4bb from 0 to the predetermined current D corresponding to the predetermined lighting state. In other words, the drive current calculator 2 increases the drive currents for the R light sources 4rc and 4rd to the predetermined current C over a predetermined time longer than the time for increasing the drive currents for the B light sources 4ba and 4bb to the predetermined current D.

Although FIG. 3 illustrates that the predetermined currents C and D equal to each other, they may be different from each other.

Next, in the step S107, the system controller 1 determines whether the drive currents of the B light sources 4ba and 4bb have reached the predetermined current D or higher. When the drive currents for the B light sources 4ba and 4bb reach the predetermined current D or higher, the system controller 1 proceeds to the step S108. On the other hand, when the drive currents for the B light sources 4ba and 4bb have not reached the predetermined current D or higher, the determination in the step S107 is performed again after the predetermined standby time has elapsed.

In the step S108, the system controller 1 determines whether the drive currents for the R light sources 4rc and 4rd have reached a predetermined current C or higher. When the drive currents for the R light sources 4rc and 4rd have reached the predetermined current C or higher, the system controller 1 ends this processing. On the other hand, when the drive currents for the R light sources 4rc and 4rd have not reached the predetermined current C or higher, the determination in the step S108 is performed again after the predetermined standby time has elapsed. The processing of the step S107 may be performed after the processing of the step S108.

The timing when the drive currents for the R light sources 4rc and 4rd reach the predetermined current C, the timing when the drive currents for the B light sources 4ba and 4bb reach the predetermined current D, and the timing when the number of rotations of the phosphor 15 reach the predetermined number of rotations may be equal to one another as illustrated in FIG. 3. Thereby, the light source startup time which is the time from the step S103 to the S108 can be shortened.

This embodiment controls the R light sources 4rc and 4rd from the lighting starts to the predetermined lighting states by taking a longer time than the B light sources 4ba and 4bb, and starts turning on the R light sources 4rc and 4rd earlier than the B light sources 4ba and 4bb. More specifically, the R light sources 4rc and 4rd start turning on before the R and B light sources cooling fans 6r and 6b start cooling and before the phosphor 15 (motor 17) starts rotating, and the B light sources 4ba and 4bb start turning on after the cooling starts and after the phosphor 15 starts rotating. Thereby, the COD in the R light sources 4rc and 4rd is likely to reduce, and the startup time of the projector can be shortened.

Second Embodiment

Figure 4:
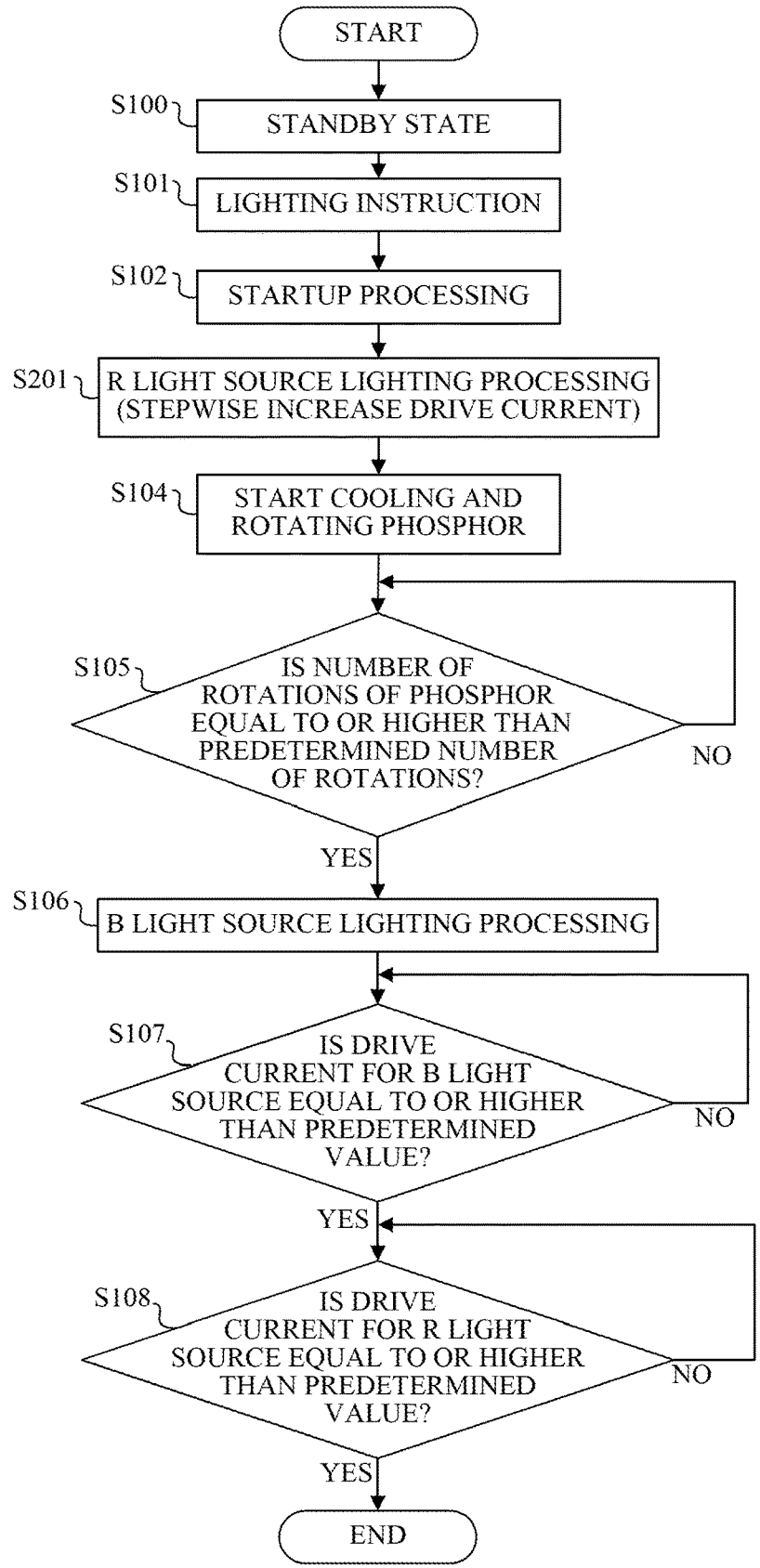
FIG. 4 is a flowchart showing processing according to a second embodiment of the present invention.

Referring now to FIG. 4, a description will be given of a second embodiment according to the present invention. This embodiment stepwise increases the drive currents supplied to the R light sources 4rc and 4rd.

In a flowchart of FIG. 4, processing of the steps S100 to S102 and the steps S104 to S108 are the same as the processing of the steps S100 to S102 and the steps S104 to S108 according to the first embodiment (FIG. 2). This embodiment performs processing of the step S201 instead of the step S103 in the first embodiment (FIG. 2).

In the step S201, the system controller 1 instructs the drive current calculator 2 to calculate the drive currents for lighting the R light sources 4rc and 4rd, and instructs the light source driver 3 to supply the drive currents to the R light sources 4rc and 4rd. The drive current calculator 2 stepwise increases the drive currents supplied to the R light sources 4rc and 4rd from 0 to a predetermined current C corresponding to the predetermined lighting state by taking the predetermined time. More specifically, for example, the drive currents for the R light sources 4rc and 4rd are increased several times by a predetermined current value to the predetermined current C by taking the predetermined time of about 15 seconds from 0 to the predetermined current C.

Similar to the first embodiment, this embodiment can reduce the likelihood of the COD in the R light sources 4rc and 4rd, and shorten the startup time of the projector.

Third Embodiment

Figure 5:
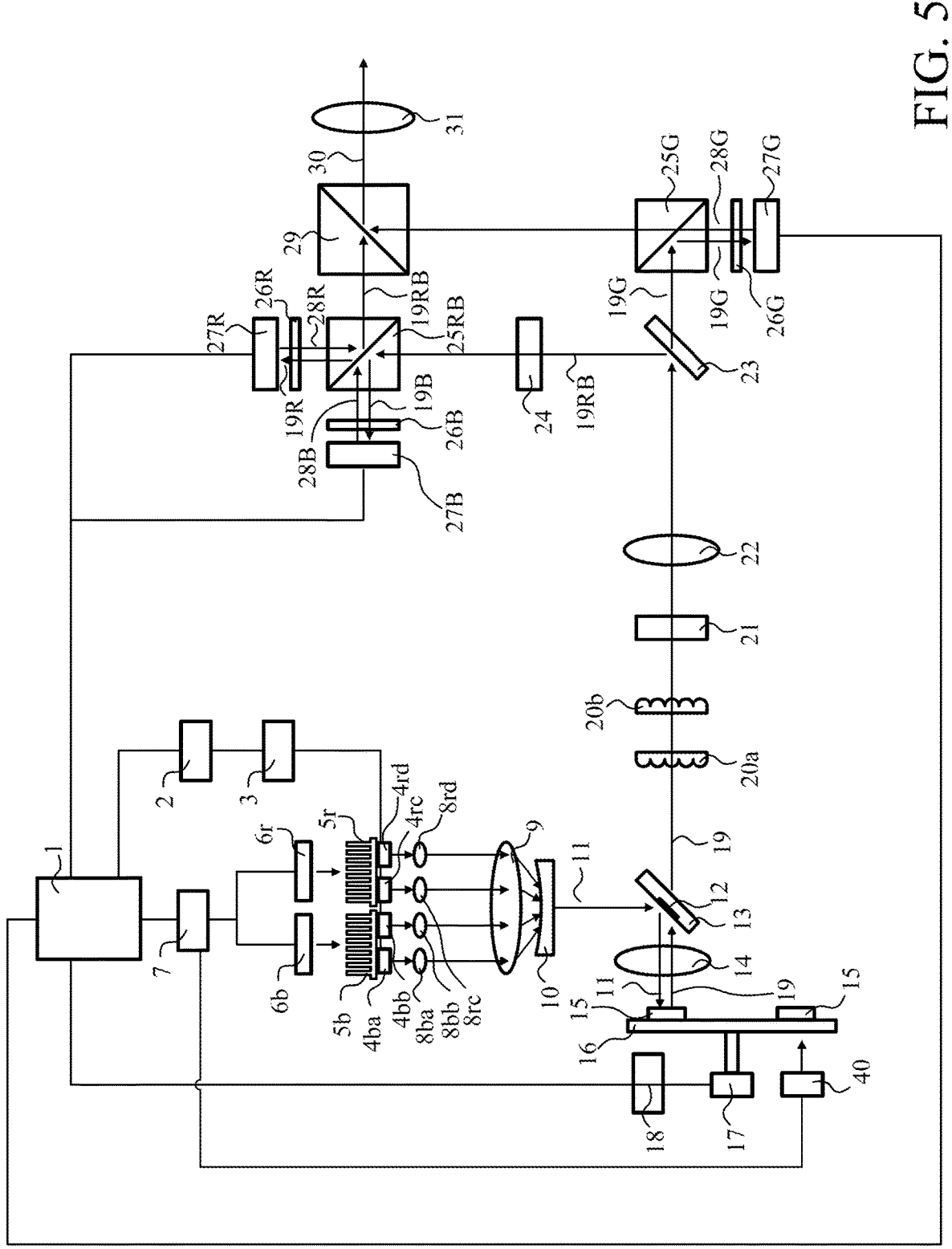
FIG. 5 is a block diagram showing a configuration of a projector according to a third embodiment of the present invention.

Next follows a description of a third embodiment according to the present invention. FIG. 5 illustrates a configuration of a projector according to this embodiment. Among components illustrated in FIG. 5, components common to those of the first embodiment (FIG. 1) will be designated by the same reference numerals as those of the first embodiment, and a description thereof will be omitted.

The projector according to this embodiment includes a phosphor cooler 40. The phosphor cooler 40 includes a cooling fan for cooling the phosphor 15 (the phosphor cooler will be referred to as a phosphor cooling fan hereinafter). The phosphor cooling fan 40 cools the phosphor 15 by cooling the phosphor support member 16. The system controller 1 can control the temperature of the phosphor 15 by controlling the number of rotations of the phosphor cold fan 40 through the cooling controller 7.

Figure 6:
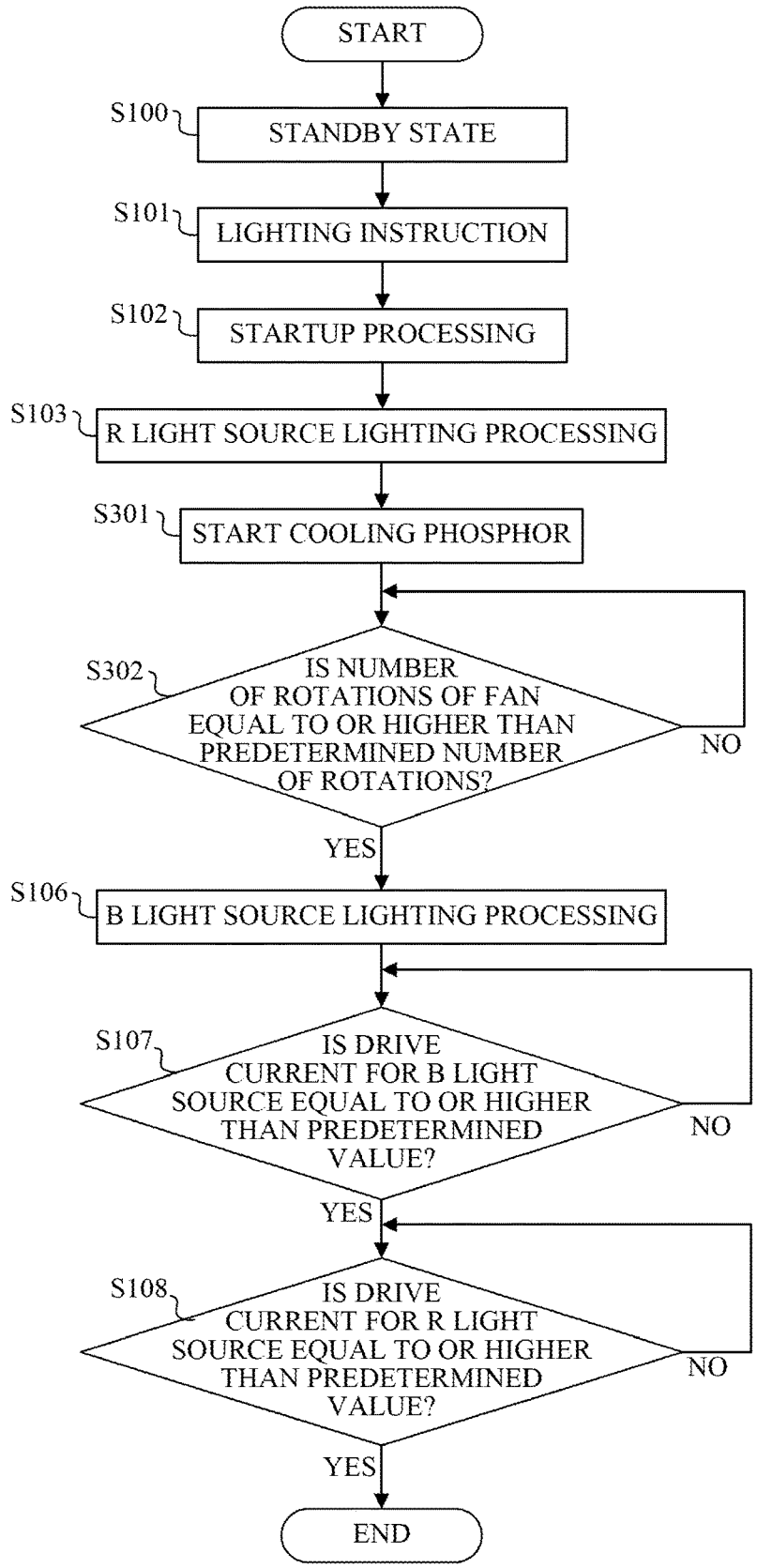
FIG. 6 is a flowchart showing processing according to the third embodiment.

A flowchart in FIG. 6 illustrates lighting startup processing of the B light sources 4ba and 4bb and the R light sources 4rc and 4rd according to this embodiment. In the flowchart in FIG. 6, the processing of the steps S100 to S102 and the steps S104 to S108 is the same as the processing of the steps S100 to S103 and the steps S106 to S108 according to the first embodiment (FIG. 2). This embodiment performs processing of the steps S301 and S302 instead of the steps S103 and S104 in the first embodiment (FIG. 2).

In the step S301, the system controller 1 starts rotating the phosphor cooling fan 40.

Next, in the step S302, the system controller 1 determines whether the number of rotations of the phosphor cooling fan 40 has reached a predetermined number of rotations or higher. When the number of rotations of the phosphor cooling fan 40 reaches the predetermined number of rotations or higher, the system controller 1 proceeds to the step S106. On the other hand, when the number of rotations of the phosphor cooling fan 40 has not reached the predetermined number of rotations or higher, the determination in the step S302 is performed again after the predetermined standby time has elapsed.

In order to prevent the phosphor 15 from being damaged by the irradiation of the excitation light 11, the B light sources 4ba and 4bb can be turned on in this embodiment only when the number of rotations of the phosphor cooling fan 40 reaches a predetermined number of rotations or higher.

Similar to the first embodiment, this embodiment can reduce the likelihood of the COD in the R light sources 4rc and 4rd, and shorten the startup time of the projector.

Fourth Embodiment

Referring now to a flowchart in FIG. 7, a description will be given of a fourth embodiment according to the present invention. This embodiment combines the second embodiment and the third embodiment with each other, rotates the phosphor cooling fan 40, and stepwise increases the drive currents supplied to the R light sources 4rc and 4rd.

Figure 7:
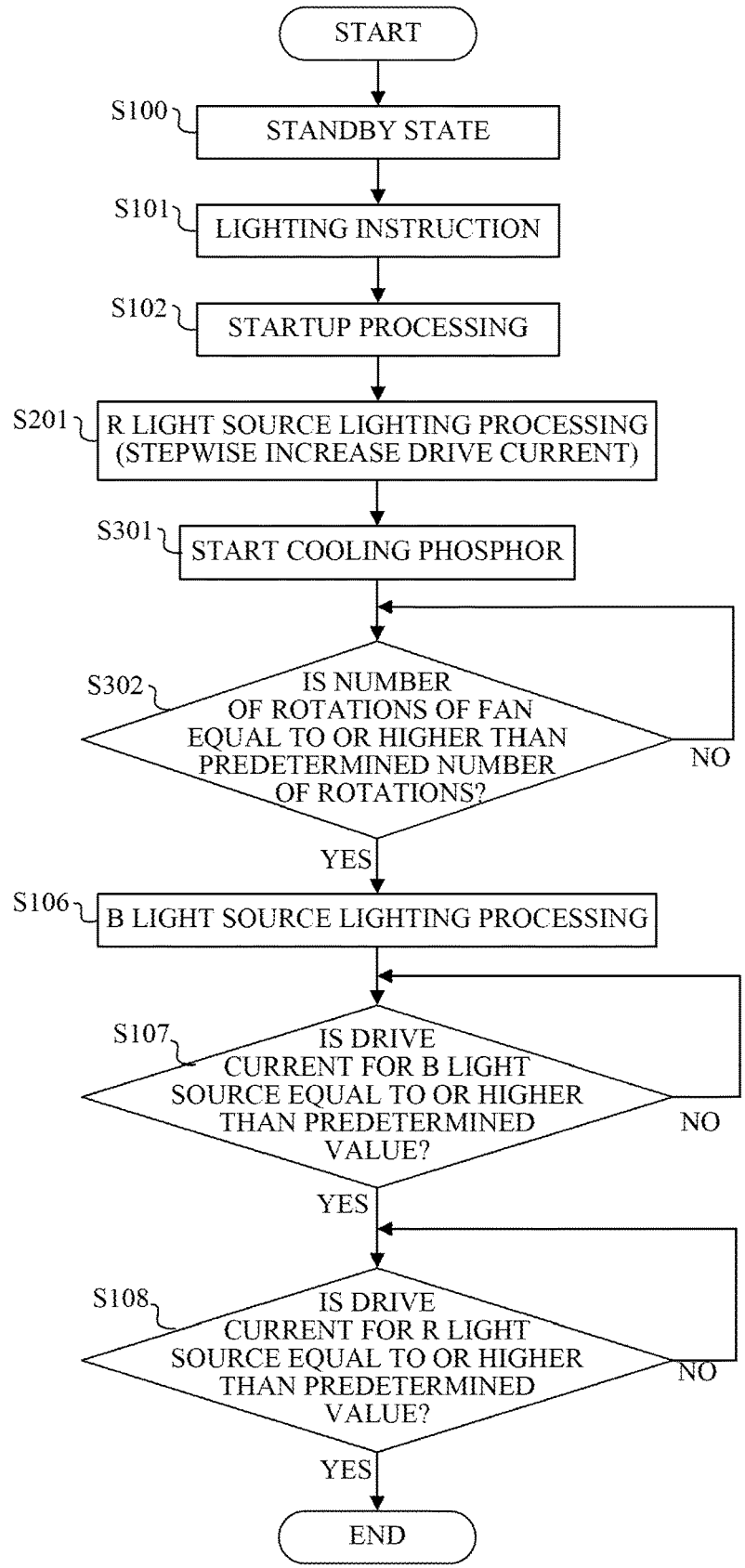
FIG. 7 is a flowchart showing processing according to a fourth embodiment of the present invention.

In a flowchart of FIG. 7, processing of the steps S100 to S102, the step S201, and the steps S106 to S108 are the same as the processing of the steps S100 to S102, the step S201, and the steps S106 to S108 in the second embodiment (FIG. 4). The processing of the step S301 and S302 are the same as the processing of the steps S301 and S302 in the third embodiment (FIG. 6).

Similar to the first embodiment, this embodiment can reduce the likelihood of the COD in the R light sources 4rc and 4rd, and shorten the startup time of the projector.

Fifth Embodiment

Figure 8:
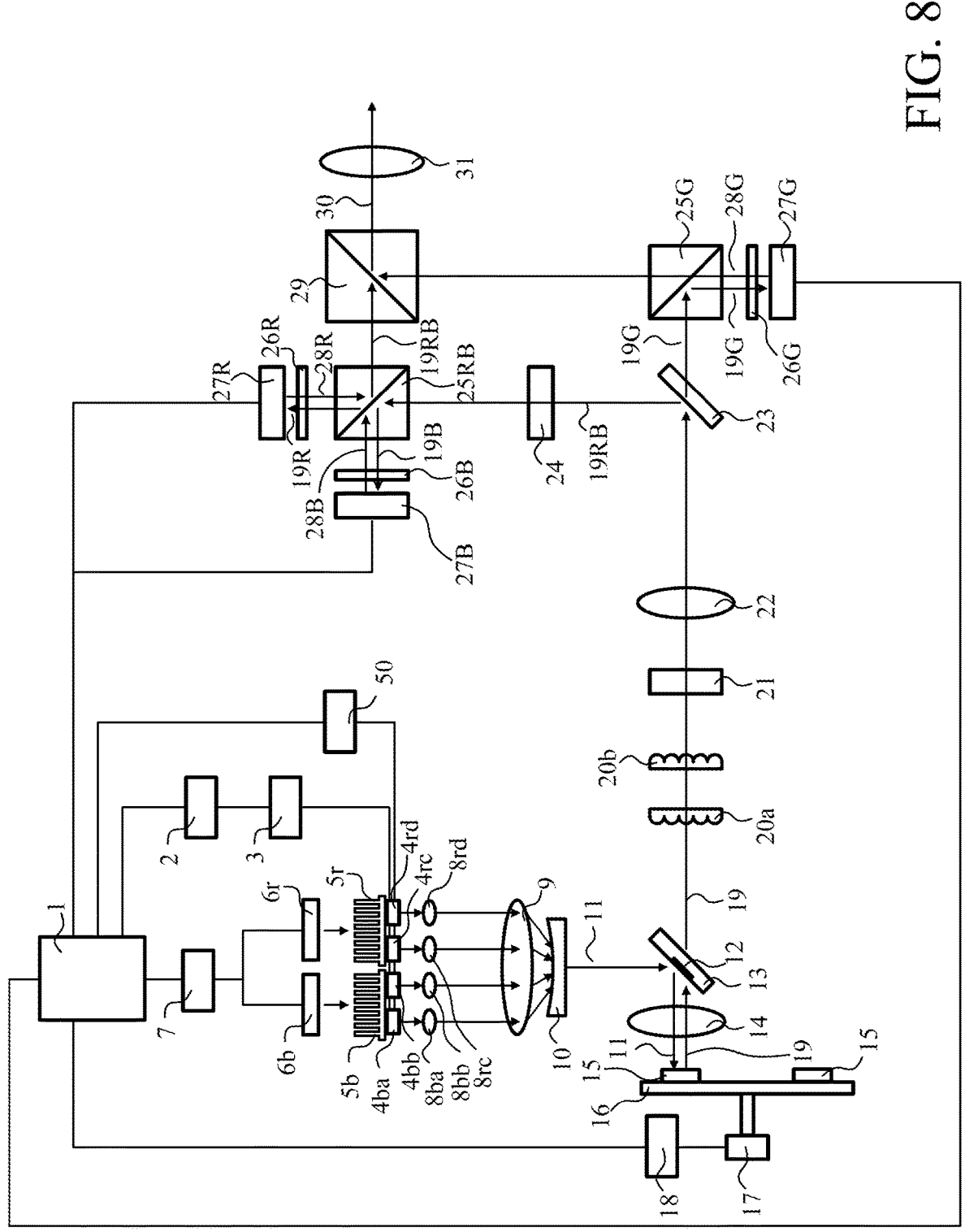
FIG. 8 is a block diagram showing a configuration of a projector according to a fifth embodiment of the present invention.

Next follows a description of a fifth embodiment according to the present invention. FIG. 8 illustrates a configuration of a projector according to this embodiment. Among components illustrated in FIG. 8, components common to those of the first embodiment (FIG. 1) will be designated by the same reference numerals as those of the first embodiment, and a description thereof will be omitted.

The projector according to this embodiment has a temperature measurement unit (temperature detector) 50. The temperature measurement unit 50 detects the temperatures of the R light sources 4rc and 4rd. The temperature measurement unit 50 may directly detect the temperatures of the R light source 4rc and 4rd, or indirectly detect the temperatures of the R light source 4rc and 4rd by detecting the temperature of the R light source heat sink 5r or the like.

Figure 9:
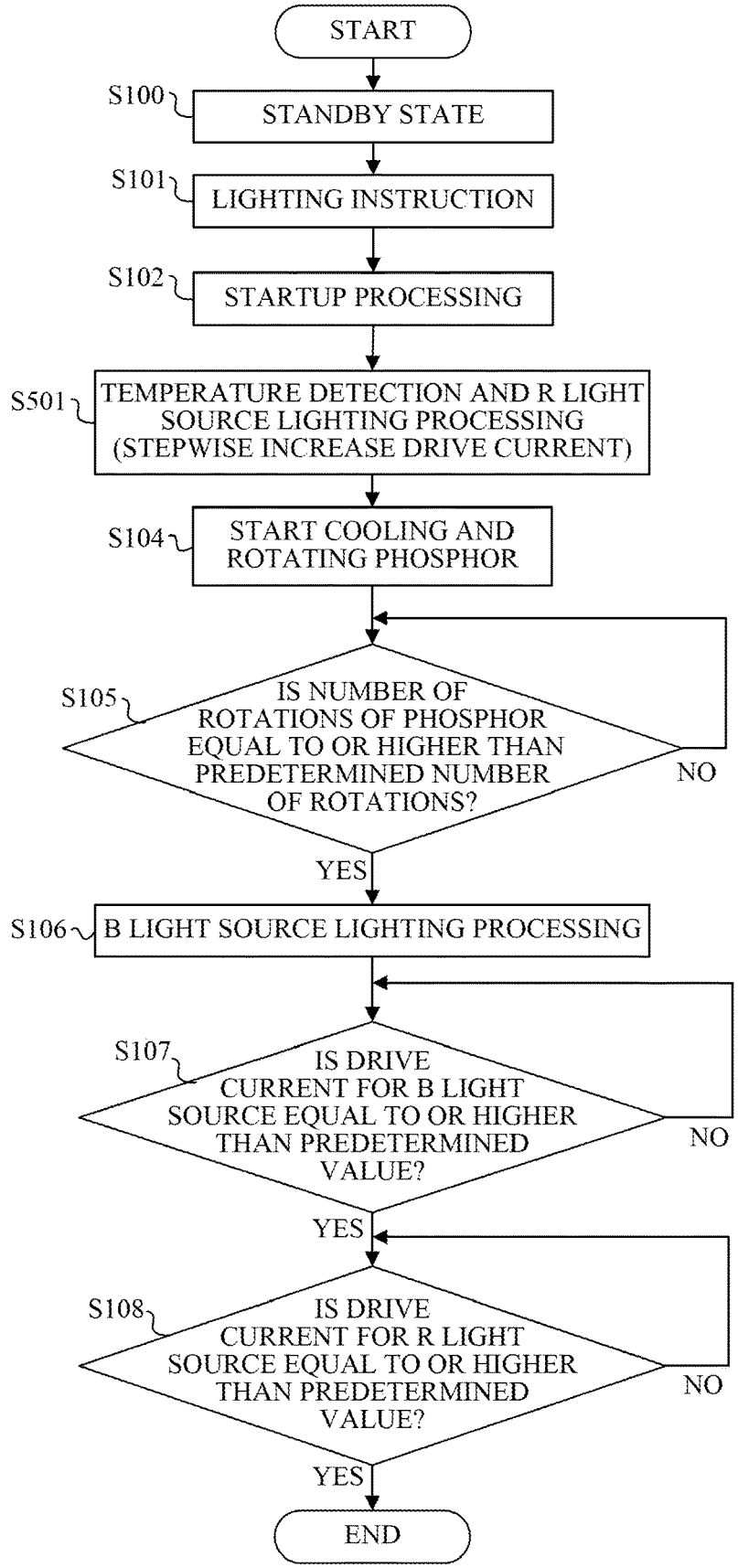
FIG. 9 is a flowchart showing processing according to the fifth embodiment.

A flowchart of FIG. 9 illustrates lighting startup processing of the B light sources 4ba and 4bb and the R light sources 4rc and 4rd in this embodiment. In the flowchart of FIG. 9, the processing of the steps S100 to S102 and the steps S104 to S108 are the same as the processing of the steps S100 to S102 and the steps S104 to S108 in the first embodiment (FIG. 2).

This embodiment performs processing of the step S501 instead of the step S103 in the first embodiment (FIG. 2).

In the step S501, the system controller 1 instructs the temperature measurement unit 50 to detect the temperatures of the R light sources 4rc and 4rd. The system controller 1 instructs the drive current calculator 2 to calculate the drive currents for the R light sources 4rc and 4rd according to the detected temperature, and changes the drive currents for the R light sources 4rc and 4rd according to the calculation result. This embodiment stepwise increases the drive currents for the R light sources 4rc and 4rd similar to the second embodiment. At this time, as the temperatures of the R light sources 4rc and 4rd become lower, the increase amount of the drive current for each time is made smaller. Thereby, the time becomes long for which the drive currents for the R light sources 4rc and 4rd increase from 0 to the predetermined current corresponding to the predetermined lighting state.

On the contrary, as the temperatures of the R light sources 4rc and 4rd become higher, the increase amount of the drive current for each time is made larger. Thereby, the time becomes shorter for which the drive currents for the R light sources 4rc and 4rd increase from 0 to the predetermined current corresponding to the predetermined lighting state.

Similar to the first embodiment, this embodiment can reduce the likelihood of the COD in the R light sources 4rc and 4rd. By controlling the drive currents for the R light sources 4rc and 4rd in accordance with the detected temperatures of the R light sources 4rc and 4rd, the startup time of the projector can be made as short as possible.

Each of the above embodiments can shorten the startup time until the lighting of the first and second light sources is completed while suppressing the COD in the second light source.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-162674, filed on Aug. 31, 2018, which is hereby incorporated by reference herein in its entirety.

What is claimed is:

1. A light source apparatus comprising:
a first light source;
a second light source configured to emit light with a different wavelength than that of the first light source;
a wavelength conversion element configured to generate converted light having a wavelength different from that of incident light from the first light source;
a motor configured to rotate the wavelength conversion element; and
a controller that controls each of the first and second light sources so that a time required for a drive current for the second light source to increase from a start of a second lighting control to a second predetermined current corresponding to a predetermined lighting state is longer than a time required for a drive current for the first light source to increase from a start of a first lighting control to a first predetermined current corresponding to the predetermined lighting state, the start of the second lighting control of the second light source is earlier than a start of supplying current to the motor to start rotating the motor, and the start of the first lighting control of the first light source is later than the start of supplying current to the motor.

2. The light source apparatus according to claim 1, further comprising:
a cooler configured to cool the first and second light sources,
wherein the controller starts lighting the second light source before the cooler starts cooling the second light source, and starts lighting the first light source after the cooler starts cooling the first light source.

3. The light source apparatus according to claim 1, wherein the controller continuously or stepwise increases the drive current for the second light source from the start of the second lighting control to the first predetermined current over a longer time than increasing the drive current for the first light source.

4. The light source apparatus according to claim 1, wherein the first light source is a semiconductor laser diode configured to emits blue light, and the second light source is a semiconductor laser diode configured to emit red light.

5. The light source apparatus according to claim 1, further comprising:
a temperature detector configured to detect a temperature of the second light source, and
wherein the controller controls the drive current for the second light source according to a detected temperature.

6. An image projection apparatus comprising:
a light source apparatus; and
a light modulator configured to modulate light from the light source apparatus,
wherein the image projection apparatus projects an image formed by light from the light modulator onto a projection surface, and
wherein the light source apparatus includes:
a first light source;
a second light source configured to emit light with a different wavelength than that of the first light source;
a wavelength conversion element configured to generate converted light having a wavelength different from that of incident light from the first light source;
a motor configured to rotate the wavelength conversion element; and
a controller that controls each of the first and second light sources so that a time required for a drive current for the second light source to increase from a start of a second lighting control to a second predetermined current corresponding to a predetermined lighting state is longer than a time required for a drive current for the first light source to increase from a start of a first lighting control to a first predetermined current corresponding to the predetermined lighting state, and the start of the second lighting control of the second light source is earlier than a start of supplying current to the motor to start rotating the motor, and the start of the first lighting control of the first light source is later than the start of supplying current to the motor.

7. A control method of a light source apparatus including a first light source, a second light source configured to emit light with a different wavelength from that of the first light source, a wavelength conversion element configured to generate converted light having a wavelength different from that of incident light from the first light source, and a motor configured to rotate the wavelength conversion element, the control method comprising the steps of:
starting a second lighting control of the second light source prior to starting a first lighting control of the first light source; and
controlling the first light source and the second light source so that a time required for a drive current for the second light source to increase from the start of the second lighting control to a second predetermined current corresponding to a predetermined lighting state is longer than a time required for a drive current for the first light source to increase from the start of the first lighting control to a first predetermined current corresponding to the predetermined lighting state, the start of the second lighting control of the second light source is earlier than a start of supplying of current to the motor to start rotating the motor, and the start of the first lighting control of the first light source is later than the start of supplying current to the motor.

8. A non-transitory computer-readable storage medium storing a computer program executable by a computer of a light source apparatus including a first light source, a second light source configured to emit light with a different wavelength from the first light source, a wavelength conversion element configured to generate converted light having a wavelength different from that of incident light from the first light source, and a motor configured to rotate the wavelength conversion element, to execute a control method comprising the steps of:
starting a second lighting control of the second light source prior to starting a first lighting control of the first light source; and controlling the first light source and the second light source so that a time required for a drive current for the second light source to increase from the start of the second lighting control to a second predetermined current corresponding to a predetermined lighting state is longer than a time required for a drive current for the first light source to increase from the start of the first lighting control to a first predetermined current corresponding to the predetermined lighting state, the start of the second lighting control of the second light source is earlier than a start of supplying current to the motor to start rotating the motor, and the start of the first lighting control of the first light source is later than the start of supplying current to the motor.

* * * * *